(12) United States Patent
Dern et al.

(10) Patent No.: US 8,969,477 B2
(45) Date of Patent: Mar. 3, 2015

(54) POLYCARBONATE COMPOSITIONS HAVING IMPROVED MECHANICAL PROPERTIES

(75) Inventors: Gesa Dern, Duesseldorf (DE); Heinz Pudleiner, Krefeld (DE); Tanja Cassel, Oberhausen (DE); Carsten Witzke, Toenisvorst (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 13/528,355

(22) Filed: Jun. 20, 2012

(65) Prior Publication Data
US 2012/0259055 A1    Oct. 11, 2012

Related U.S. Application Data

(63) Continuation of application No. 12/965,233, filed on Dec. 10, 2010, now abandoned.

(30) Foreign Application Priority Data

Dec. 12, 2009   (DE) .......................... 10 2009 058 100

(51) Int. Cl.
*C08L 69/00* (2006.01)
*C08L 53/00* (2006.01)

(52) U.S. Cl.
CPC . *C08L 69/00* (2013.01); *C08L 53/00* (2013.01)
USPC .......................................... 525/88; 525/92 E

(58) Field of Classification Search
USPC .................................................. 525/88, 92 E
See application file for complete search history.

(56) References Cited

U.S. PATENT DOCUMENTS

| | | | |
|---|---|---|---|
| 2,970,131 A | 1/1961 | Moyer, Jr. | |
| 2,991,273 A | 7/1961 | Hechelhammer et al. | |
| 2,999,835 A | 9/1961 | Goldberg | |
| 2,999,846 A | 9/1961 | Schnell et al. | |
| 3,028,365 A | 4/1962 | Schnell et al. | |
| 3,062,781 A | 11/1962 | Bottenbruch et al. | |
| 3,148,172 A | 9/1964 | Fox | |
| 3,271,367 A | 9/1966 | Schnell et al. | |
| 3,275,601 A | 9/1966 | Schnell et al. | |
| 4,982,014 A | 1/1991 | Freitag et al. | |
| 5,104,723 A | 4/1992 | Freitag et al. | |
| 5,126,428 A * | 6/1992 | Freitag et al. ................. | 528/196 |
| 5,227,458 A | 7/1993 | Freitag et al. | |
| 5,849,845 A | 12/1998 | Koehler et al. | |
| 2007/0072995 A1* | 3/2007 | Kang et al. ................... | 525/92 E |
| 2008/0214723 A1* | 9/2008 | Moulinie ...................... | 524/539 |

FOREIGN PATENT DOCUMENTS

| | | |
|---|---|---|
| DE | 1570703 A1 | 2/1970 |
| DE | 2063050 A1 | 7/1972 |
| DE | 2063052 A1 | 7/1972 |
| DE | 2211956 A1 | 10/1973 |
| DE | 3832396 A1 | 2/1990 |
| DE | 4009759 A1 | 10/1991 |
| EP | 0362646 A2 | 4/1990 |
| EP | 0722984 A2 | 7/1996 |
| FR | 1561518 A | 3/1969 |
| GB | 1122003 A | 7/1968 |
| GB | 1229482 A | 4/1971 |
| GB | 1341318 A | 12/1973 |
| GB | 1367788 A | 9/1974 |
| GB | 1367790 A | 9/1974 |
| WO | WO-99/55772 A1 | 11/1999 |
| WO | WO-2005/042638 A1 | 5/2005 |
| WO | WO-2006/001570 A1 | 1/2006 |

OTHER PUBLICATIONS

Hausmann et al., CAPLUS AN 2002:855143 (2002).*

* cited by examiner

*Primary Examiner* — Jeffrey Mullis
(74) *Attorney, Agent, or Firm* — Drinker Biddle & Reath LLP

(57) ABSTRACT

The invention relates to compositions containing at least one (co)polycarbonate stable at high temperature and at least one ethylene-alkyl acrylate block copolymer, and to moldings and injection molded parts and extrudates obtainable from these compositions.

12 Claims, No Drawings

POLYCARBONATE COMPOSITIONS HAVING IMPROVED MECHANICAL PROPERTIES

RELATED APPLICATIONS

This application is a continuation application of U.S. patent application Ser. No. 12/965,233, filed Dec. 10, 2010, which claims benefit to German Patent Application No. 10 2009 058 100.6, filed Dec. 12, 2009, which is incorporated herein by reference in its entirety for all useful purposes.

BACKGROUND OF THE INVENTION

The invention relates to compositions containing at least one (co)polycarbonate stable at high temperature and at least one ethylene-alkyl acrylate block copolymer. This application furthermore relates to mouldings or injection moulded parts and extrudates obtainable from these compositions, and to processes for the preparation of the polycarbonate compositions, and to the mouldings and extrudates. These polycarbonate compositions are distinguished in that, together with high thermal stability, the flexural fatigue strength of the films produced from the resulting material is improved.

In automobile seats, films via which the triggering of the airbag is controlled are used: depending on the weight of the person and the seat position, the airbag is selectively triggered. These films must be stable to high temperatures so that, in printing with electrically conductive paste, it is possible to use drying temperatures which are as high as possible. Owing to the bending stress in the seat surface, the film must additionally meet particular requirements regarding the flexing resistance (flexural fatigue strength, determinable via the double fold number according to Schopper according to ISO 5625).

The uses of polycarbonate stable at high temperature as a base material of films is known. These products, inter alia obtainable as Bayfol® 1202 from Bayer MaterialScience AG, are used, for example, in loudspeaker membranes.

These films are very suitable for the application described above, owing to their high thermal stability, but the flexing resistance of the products is insufficient.

An improvement in the mechanical properties of polymers by addition of elastomers is known per se.

For example, WO 2006/01570 A1 describes the mixtures of polycarbonates and 0.1-50% by weight of the ethylene-alkyl acrylate copolymers. The material thus obtained has a high impact strength in combination with high flowability while retaining the other properties. However, this document does not disclose polycarbonates stable at high temperature, which are important for the desired applications. There is no indication of improvement of the double fold numbers in this laid-open application.

WO 2005/042638 A1 describes the improvement of polycarbonate/ABS blends by the addition of modifiers in the compulsory combination of ethylene-alkyl acrylate copolymer with ethylene/butyl acrylate/glycidyl methacrylate terpolymer. Here too, this document does not disclose polycarbonates stable at high temperature in the composition according to the invention.

EP 362 646 A2 describes compositions of polycarbonates having high heat distortion resistance with elastomers. Improved properties with regard to double fold numbers on the other hand are not described. However, this laid-open application gives no indication that the special modifier in the application according to the invention leads to the desired aim.

DE 40 09 759 A1 describes the mixture of polypropylene with polycarbonates having high heat distortion resistance as a method for producing mixtures having better compatibility.

EP 722 984 A2 describes mixtures of polycarbonate stable at high temperature and terpolymers of ethylene, acrylates and epoxy-functionalized monomers. The effect here is an increase in the stress cracking resistance and impact strength of the polycarbonate while the heat distortion resistance is retained. However, the present application relates to compositions of different nature.

In the context of this application, polycarbonate compositions (or blends) are understood as meaning mixtures of two or more polycarbonates which may optionally be provided with additives.

Starting from the prior art, it was thus the object to develop compositions of polycarbonates which have high heat distortion resistance, said compositions having an improved flexural fatigue strength.

EMBODIMENTS OF THE INVENTION

An embodiment of the present invention is a polycarbonate composition comprising:
A) from 82 to 99.5% by weight, based in each case on the sum of the parts by weight of the components A and B, of at least one polycarbonate having high heat distortion resistance and based on one or more cycloaliphatic bisphenols of Formula (1a)

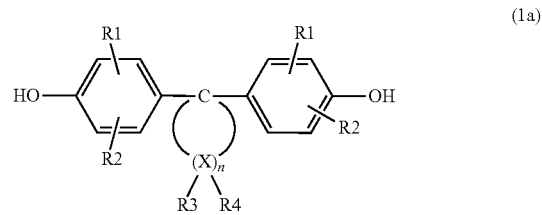

wherein
R1 and R2 are, independently of one another, hydrogen, halogen, $C_1$-$C_8$-alkyl, $C_5$-$C_6$-cycloalkyl, phenyl, or $C_7$-$C_{12}$-aralkyl,
n is an integer from 4 to 7,
R3 and R4 are selectable for each X individually and are, independently of one another, hydrogen or $C_1$-$C_6$-alkyl, and
X is carbon,
with the proviso that, on at least one X, R3 and R4 simultaneously arealkyl; and
B) from 0.5 to 18% by weight, based in each case on the sum of the parts by weight of the components A and B, of at least one ethylene-alkyl acrylate block copolymer.

Another embodiment of the present invention is the above polycarbonate composition, wherein R1 and R2 are, independently of one another, chlorine, bromine, methyl, phenyl, or H, and n is 4 or 5.

Another embodiment of the present invention is the above polycarbonate composition, wherein component A comprises a copolycarbonate of bisphenol A and bisphenol TMC.

Another embodiment of the present invention is the above polycarbonate composition, wherein said composition contains from 89 to 99 parts by weight of component A and from 1 to 11 parts by weight of component B, based in each case on the sum of the parts by weight of the components A and B.

Another embodiment of the present invention is the above polycarbonate composition, wherein said ethylene-alkyl (meth)acrylate block copolymer of component B is an ethylene-alkyl (meth)acrylate block copolymer of formula (4):

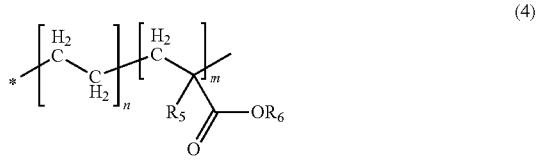

(4)

wherein

R$_5$ is methyl or hydrogen,

R$_6$ is hydrogen or a C$_1$ to C$_{12}$ alkyl radical, and n and m are degrees of polymerization.

Another embodiment of the present invention is the above polycarbonate composition, wherein R$_6$ is methyl, ethyl, propyl, isopropyl, butyl, sec-butyl, tert-butyl, isobutyl, hexyl, isoamyl, or tert-amyl.

Another embodiment of the present invention is the above polycarbonate composition, wherein the ratio of the degree of polymerization n to degree of polymerization m is in the range of from 1:300 to 90:10.

Another embodiment of the present invention is the above polycarbonate composition, further comprising from 0 to 5 parts by weight, based on the sum of the parts by weight of the components A and B, of additives as component C.

Yet another embodiment of the present invention is a shaped article, extrudate, film, or film laminate obtained from the above polycarbonate composition.

Another embodiment of the present invention is the above shaped article, extrudate, or film comprising coextrusion layers obtained from the above polycarbonate composition, wherein said at least one polycarbonate is a copolycarbonate.

Another embodiment of the present invention is the above shaped article, extrudate, film, or film laminate, wherein said article, extrudate, film, or film laminate is a housing part of an electrical device or apparatus, a tool housing, a mobile telephone, a heating/ventilation panel, a tachometer disc, an instrument dial, a panel, a keyboard in an electrical or an electronic device, a lense, a screen/display cover, an LED application, or a film for an automobile seat.

Another embodiment of the present invention is the above housing part of an electrical device or apparatus, wherein said electrical device or apparatus is a switch box.

Yet another embodiment of the present invention is a process for preparing the above polycarbonate composition comprising the step of compounding one or more polycarbonates according to the phase boundary process.

DESCRIPTION OF THE INVENTION

It has now surprisingly been found that the addition of elastomeric modifiers (elastomeric block copolymers with ethylene as one of the monomers) to the polycarbonate stable at high temperature improves the double fold number without significantly reducing the heat distortion resistance (Vicat softening temperatures >165° C.).

Only by addition of ethylene-alkyl acrylate block copolymers was it possible to meet the high requirements with regard to the thermal stability and to improve the flexural fatigue strength of the films produced from the resulting material.

In the determination of the flexing resistance for determining the double fold number according to Schopper on films of different thickness, it was found that the improvement in the notched impact strength does not correlate with an improvement in the flexing resistance.

The present invention therefore relates to compositions containing

A) 82-99.5% by weight, preferably 85-99% by weight, particularly preferably 89-99% by weight (based in each case on the sum of the parts by weight of the components A+B), of at least one polycarbonate having high heat distortion resistance and based on one or more cycloaliphatic bisphenols of the formula 1

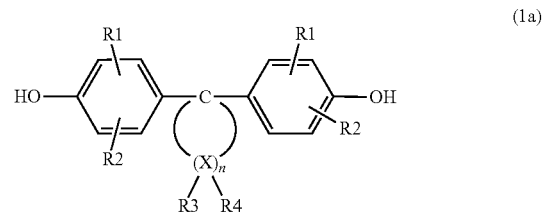

(1a)

in which

R1 and R2, independently of one another, denote hydrogen, halogen, preferably chlorine or bromine, C$_1$-C$_8$-alkyl, C$_5$-C$_6$-cycloalkyl, phenyl, C$_7$-C$_{12}$-aralkyl, in particular methyl, phenyl or H and especially H, n is an integer from 4 to 7, preferably 4 or 5, R3 and R4 are selectable for each X individually and, independently of one another, denote hydrogen or C$_1$-C$_6$-alkyl and X denotes carbon, with the proviso that, on at least one atom X, R3 and R4 simultaneously denote alkyl, preferably methyl;

copolycarbonates of bisphenol A and bisphenol TMC are particularly preferred, and B) 0.5-18% by weight, preferably 1-15% by weight, particularly preferably 1-11% by weight, most preferably 1-10% by weight (based in each case on the sum of the parts by weight of the components A+B), of at least one ethylene-alkyl acrylate block copolymer, C) optionally 0 to 5 parts by weight, preferably 0 to 2 parts by weight, particularly preferably 0 to 1 part by weight (based in each case on the sum of the parts by weight of the components A+B), of additives.

Component A

Suitable polycarbonates are preferably high molecular weight, thermoplastic, aromatic polycarbonates having M$_w$ (weight average molecular weight) of at least 10 000 g/mol, preferably of 20 000 g/mol to 300 000 g/mol, which contain bifunctional carbonate structural units of the formula (1)

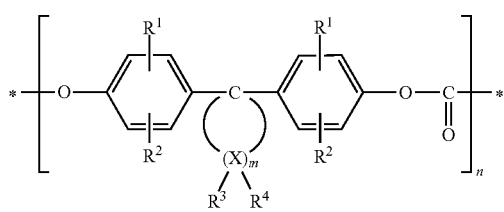

(1)

in which
- $R^1$ and $R^2$, independently of one another, denote hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, in particular benzyl,
- m denotes an integer from 4 to 7, preferably 4 or 5,
- $R^3$ and $R^4$, individually selectable for each X, independently of one another, denote hydrogen or $C_1$-$C_6$-alkyl and
- X denotes carbon, with the proviso that $R^3$ and $R^4$ simultaneously denote alkyl on at least one atom X.

Starting materials for polycarbonates are dihydroxydiphenylcycloalkanes of the formula (1a)

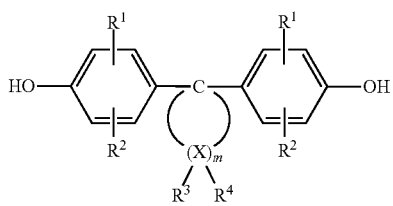

(1a)

in which
- X, $R^1$, $R^2$, $R^3$, $R^4$ and m have the meaning stated for the formula (I).

Preferably, $R^3$ and $R^4$ are simultaneously alkyl on 1-2 atoms X, in particular only on one atom X.

A preferred alkyl radical is methyl; the X atoms in the alpha-position to the diphenyl-substituted C atom (C-1) are preferably not dialkyl-substituted; on the other hand, the alkyl disubstitution in the beta-position to C-1 is preferred.

Dihydroxydiphenylcycloalkanes having 5 and 6 ring C atoms in the cycloaliphatic radical (m=4 or 5 in formula (1a)), for example diphenols of the formulae (1b) to (1d),

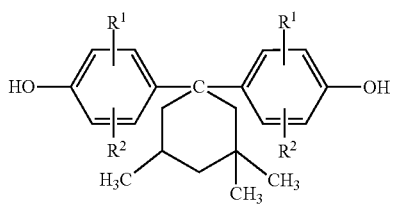

(1b)

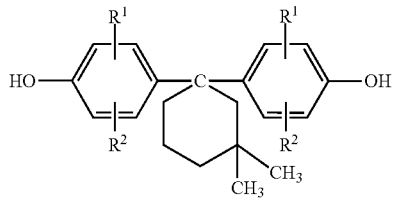

(1c)

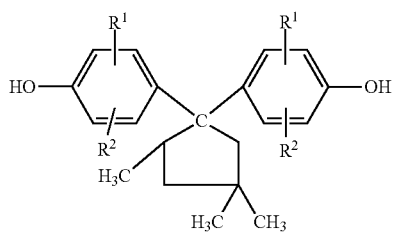

(1d)

are preferred, the 1,1-bis(4-hydroxyphenyl)-3,3,5-trimethyl-eyelohexane (formula (1b) where $R^1$ and $R^2$ are H) being particularly preferred. The polycarbonates can be prepared according to German patent application DE 3 832 396 A1 from diphenols of the formula (1a).

It is possible to use both one diphenol of the formula (1a) with formation of homopolycarbonates and a plurality of diphenols of the formula (1a) with formation of copolycarbonates.

In addition, the diphenols of the formula (1a) can also be used as a mixture with other diphenols, for example with those of the formula (2)

HO—Z—OH        (2), for the preparation of high molecular weight, thermoplastic, aromatic polycarbonates.

Suitable other diphenols of the formula (2) are those in which Z is an aromatic radical having 6 to 30 C atoms, which may contain one or more aromatic nuclei, may be substituted and may contain aliphatic radicals or cycloaliphatic radicals other than those of the formula (1a) or heteroatoms as bridge members.

Examples of the Diphenols of the Formula (2) are:
hydroquinone, resorcinol, dihydroxybiphenyls, bi(hydroxyphenyl)alkanes, bis(hydroxyphenyl)cycloalkanes, bis (hydroxyphenyl) sulphides, bis(hydroxyphenyl) ethers, bis (hydroxyphenyl) ketones, bis(hydroxyphenyl) sulphones, bis(hydroxyphenyl) sulphoxides, alpha,alpha'-bis(hydroxyphenyl)diisopropylbenzenes and their compounds which are alkylated on the nucleus and halogenated on the nucleus.

These and further suitable diphenols are described, for example, in U.S. Pat. Nos. 3,028,365, 2,999, 835, 3,148, 172, 3,275,601, 2,991,273, 3,271,367, 3,062,781, 2,970, 131 and 2,999,846, in DE-A 1 570 703, 2 063 050, 2 063 052, 2 211 956, in Fr-A 1 561 518 and in the monograph "H. Schnell, Chemistry and Physics of Polycarbonates, Interscience Publishers, New York 1964".

Examples of Preferred Other Diphenols Are:
4,4'-dihydroxybiphenyl, 2,2-bis(4-hydroxyphenyl)propane, 2,4-bis(4-hydroxyphenyl)-2-methylbutane, 1,1-bis(4-hydroxyphenyl)cyclohexane, alpha,alpha-bis(4-hydroxyphenyl)-p-diisopropylbenzene, 2,2-bis(3-methyl-4-hydroxyphenyl)propane, 2,2-bis(3-chloro-4-hydroxyphenyl) propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)-2-methylbutane, 1,1-bis(3,5-dimethyl-4-hydroxyphenyl)cyclohexane, alpha,alpha-bis (3,5-dimethyl-4-hydroxyphenyl)-p-diisopropylbenzene, 2,2-bis(3,5-dichloro-4-hydroxyphenyl)propane and 2,2-bis(3,5-dibromo-4-hydroxyphenyl)propane.

Examples of Particularly Preferred Diphenols of the Formula (2) Are:

2,2-bis(4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl) propane and 1,1-bis(4-hydroxyphenyl)cyclohexane.

In particular, 2,2-bis(4-hydroxyphenyl)propane is preferred. The other diphenols may be used both individually and as a mixture.

The molar ratio of diphenols of the formula (1a) to the other diphenols of the formula (2) which are optionally to be used concomitantly should be between 100 mol % (1a):0 mol % (2) and 2 mol % (1a):98 mol % (2), preferably between 100 mol % (1a):0 mol % (2) and 10 mol % (1a):90 mol % (2) and in particular between 100 mol % (1a):0 mol % (2) and 30 mol % (1a):70 mol % (2).

The high molecular weight polycarbonates obtained from the diphenols of the formula (1a), optionally in combination with other diphenols, can be prepared by the known polycarbonate preparation processes. The various diphenols may be linked to one another either randomly or blockwise.

The polycarbonates according to the invention may be branched in a manner known per se. If branching is desired, it can be achieved in a known manner by incorporation of small amounts, preferably in amounts between 0.05 and 2.0 mol % (based on diphenols used), of trifunctional or more than trifunctional compounds, in particular those having three or more than three phenolic hydroxyl groups, by condensation. Some branching agents having three or more than three phenolic hydroxyl groups are:

phloroglucinol, 4,6-dimethyl-2,4,6-tri(4-hydroxyphenyl) hepten-2ene, 4,6-dimethyl-2,4,6-tri(4-hydroxyphenyl) heptane, 1,3,5-tri(4-hydroxyphenyl)benzene, 1,1,1-tri(4-hydroxyphenyl)ethane, tri(4-hydroxyphenyl) phenylmethane, 2,2-bis[4,4-bis(4-hydroxyphenyl) cyclohexyl]propane, 2,4-bis(4-hydroxyphenylisopropyl) phenol, 2,6-bis(2-hydroxy-5-methylbenzyl)-4-methylphenol, 2-(4-hydroxyphenyl)-2-(2,4-dihydroxyphenyl)propane, hexa[4-(4-hydroxyphenylisopropyl)phenyl]orthoterephthalic acid ester, tetra(4-hydroxyphenyl)methane, tetra[4-(4-hydroxyphenylisopropyl)-phenoxy]methane and 1,4-bis[4',4"-dihydroxytriphenyl)methyl]benzene.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Monofunctional compounds in customary concentrations serve as chain terminators for the regulation of the molecular weight of the polycarbonates, which regulation is known per se. Suitable compounds are, for example, phenol, tert-butylphenols or other alkyl-substituted phenols. In particular, small amounts of phenols of the formula (3)

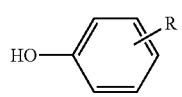

(3)

in which
R represents a branched $C_8$- and/or $C_9$-alkyl radical,
are suitable for regulating the molecular weight.

In the alkyl radical R, the proportion of $CH_3$ protons is preferably between 47 and 89% and the proportion of the CH and $CH_2$ protons between 53 and 11%; also preferably, R is in the o- and/or p-position to the OH group, and particularly preferably the upper limit of the ortho fraction is 20%. The chain terminators are generally used in amounts of 0.5 to 10, preferably 1.5 to 8, mol %, based on diphenols used.

The polycarbonates can preferably be prepared by the phase boundary process (cf. H. Schnell "Chemistry and Physics of Polycarbonates", Polymer Reviews, Vol. IX, page 33 et seq., Interscience Publ. 1964) in a manner known per se.

Here, the diphenols of the formula (1a) are dissolved in the aqueous alkaline phase. For the preparation of copolycarbonates with other diphenols, mixtures of diphenols of the formula (1a) and the other diphenols, for example those of the formula (2), are used. For regulating the molecular weight, chain terminators, for example of the formula (3), can be added. Reaction with phosgene is then carried out in the presence of an inert, preferably polycarbonate-dissolving, organic phase by the phase boundary condensation method. The reaction temperature is between 0° C. and 40° C.

The optionally concomitantly used branching agents (preferably 0.05 to 2.0 mol %) can either be initially introduced with the diphenols in the aqueous alkaline phase or added in solution in the organic solvent before phosgenation. In addition to the diphenols of the formula (1a) and optionally other diphenols (1a), the mono- and/or bischlorocarbonic acid esters thereof can also be concomitantly used, these being added in solution in organic solvents. The amount of chain terminators and of branching agents depends on the molar amount of diphenolate radicals corresponding to formula (1a) and optionally formula (2); with the concomitant use of chlorocarbonic acid esters, the amount of phosgene can be accordingly reduced in a known manner.

Suitable organic solvents for the chain terminators and optionally for the branching agents and the chlorocarbonic acid esters are, for example, methylene chloride, chlorobenzene, in particular mixtures of methylene chloride and chlorobenzene. Optionally, the chain terminators and branching agents used can be dissolved in the same solvent.

For example, methylene chloride, chlorobenzene and mixtures of methylene chloride and chlorobenzene serves as the organic phase for the phase boundary polycondensation.

For example, NaOH solution serves as the aqueous alkaline phase. The preparation of the polycarbonates by the phase boundary process can be catalysed in a customary manner by catalysts such as tertiary amines, in particular tertiary aliphatic amines, such as tributylamine or triethylamine; the catalysts can be used in amounts of 0.05 to 10 mol %, based on moles of diphenols used. The catalysts can be added before the beginning of the phosgenation or during or even after the phosgenation.

The polycarbonates can be prepared by the known process in the homogeneous phase, the so-called "pyridine process", and by the known melt transesterification process with the use of, for example, diphenyl carbonate instead of phosgene.

In the alternative melt transesterification process, the aromatic dihydroxy compounds already described for the phase boundary process are transesterified with carbonic acid diesters with the aid of suitable catalysts and optionally further additives in the melt.

In the context of the invention, carbonic acid diesters are those with the formulae (4) and (5)

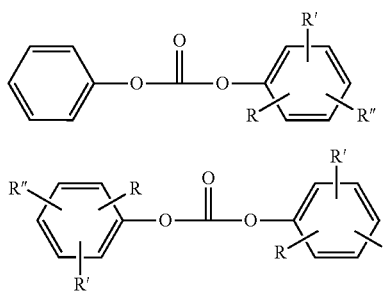

in which
R, R' and R", independently of one another, may represent H, optionally branched $C_1$-$C_{34}$-alkyl/cycloalkyl, $C_7$-$C_{34}$-alkaryl or $C_6$-$C_{34}$-aryl, for example
diphenyl carbonate, butylphenyl phenyl carbonate, dibutylphenyl carbonate, isobutylphenyl phenyl carbonate, diisobutylphenyl carbonate, tert-butylphenyl phenyl carbonate, di-tert-butylphenyl carbonate, n-pentylphenyl phenyl carbonate, di(n-pentylphenyl) carbonate, n-hexylphenyl phenyl carbonate, di(n-hexylphenyl) carbonate, cyclohexylphenyl phenyl carbonate, dicyclohexylphenyl carbonate, phenylphenol phenyl carbonate, diphenylphenol carbonate, isooctylphenyl phenyl carbonate, diisooctylphenyl carbonate, n-nonylphenyl phenyl carbonate, di(n-nonylphenyl) carbonate, cumylphenyl phenyl carbonate, dicumylphenyl carbonate, naphthylphenyl phenyl carbonate, dinaphthylphenyl carbonate, di-tert-butylphenyl phenyl carbonate, di(di-tert-butylphenyl) carbonate, dicumylphenyl phenyl carbonate, di(dicumylphenyl) carbonate, 4-phenoxyphenyl phenyl carbonate, di(4-phenoxyphenyl) carbonate, 3-pentadecylphenyl phenyl carbonate, di(3-pentadecylphenyl) carbonate, tritylphenyl phenyl carbonate, ditritylphenyl carbonate, preferably diphenyl carbonate, tert-butylphenyl phenyl carbonate, di-tert-butylphenyl carbonate, phenylphenol phenyl carbonate, diphenylphenol carbonate, cumylphenyl phenyl carbonate, dicumyiphenyl carbonate, particularly preferably diphenyl carbonate.

It is also possible to use mixtures of said carbonic acid diesters.

The proportion of carbonic acid esters is 100 to 130 mol %, preferably 103 to 120 mol %, particularly preferably 103 to 109 mol %, based on the dihydroxy compound.

Basic catalysts, such as, for example, alkali metal and alkaline earth metal hydroxides and oxides, but also ammonium or phosphonium salts, referred to below as onium salts, are used as catalysts in the context of the invention in the melt transesterification process as described in the literature mentioned. Onium salts are preferably used, particularly preferably phosphonium salts. Phosphonium salts in the context of the invention are those of the following general formula (6)

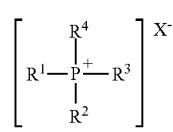

in which
$R^{1-4}$ may be the same or different $C_1$-$C_{10}$-alkyls, $C_6$-$C_{10}$-aryls, $C_7$-$C_{10}$-aralkyls or $C_5$-$C_6$-cycloalkyls, preferably methyl or $C_6$-$C_{14}$-aryls, particularly preferably methyl or phenyl, and $X^-$ may be an anion, such as hydroxide, sulphate, hydrogen sulphate, bicarbonate, carbonate, a halide, preferably chloride, or an alcoholate of the formula OR, it being possible for R to be $C_6$-$C_{14}$-aryl or $C_7$-$C_{12}$-aralkyl, preferably phenyl. Preferred catalysts are tetraphenylphosphonium chloride, tetraphenylphosphonium hydroxide, tetraphenylphosphonium phenolate, particularly preferably tetraphenylphosphonium phenolate.

The catalysts are preferably used in amounts of $10^{-8}$ to $10^{-3}$ mol, based on one mole of diphenol, particularly preferably in amounts of $10^{-7}$ to $10^{-4}$ mol.

Further catalysts may be used alone or optionally in addition to the onium salt in order to increase the rate of the polymerization. These include salts of alkali metals and alkaline earth metals, such as hydroxides, alkoxides and aryl oxides of lithium, sodium and potassium, preferably hydroxide, alkoxide or aryl oxide salts of sodium. Most preferred are sodium hydroxide and sodium phenolate. The amounts of the cocatalyst may be in the range from 1 to 200 ppb, preferably 5 to 150 ppb and most preferably 10 to 125 ppb, calculated in each case as sodium.

The transesterification reaction of the aromatic dihydroxy compound and of the carbonic acid diester in the melt is preferably carried out in two stages. In the first stage, the melting of the aromatic dihydroxy compound and of the carbonic acid diester at temperatures of 80-250° C., preferably 100-230° C., particularly preferably 120-190° C., under atmospheric pressure in 0-5 hours, preferably 0.25-3 hours, takes place. After addition of the catalyst, the oligocarbonate is prepared from the aromatic dihydroxy compound and the carbonic acid diester by applying a vacuum (up to 2 mmHg) and increasing the temperature (up to 260° C.) by distilling off the monophenol. The main amount of vapours from the process occurs here. The oligocarbonate thus prepared has a weight average molar mass $M_w$ (determined by measuring the relative solution viscosity in dichloromethane or in mixtures of equal amounts by weight of phenol/o-dichlorobenzene, calibrated by light scattering) in the range from 2000 g/mol to 18 000 g/mol, preferably from 4000 g/mol to 15 000 g/mol.

In the second stage, the polycarbonate is prepared during the polycondensation by a further increase in the temperature to 250-320° C., preferably 270-295° C., and a pressure of <2 mmHg. The remainder of vapours from the process is removed here.

The catalysts can also be used in combination (two or more) with one another.

With the use of alkali metal/alkaline earth metal catalysts, it may be advantageous to add the alkali metal/alkaline earth metal catalysts at a later time (for example after the oligocarbonate synthesis in the polycondensation in the second stage).

The reaction of the aromatic dihydroxy compound and of the carbonic acid diester to give the polycarbonate can be carried out batchwise or preferably continuously in the context of the process according to the invention, for example in stirred tanks, thin-film evaporators, falling-film evaporators, stirred tank cascades, extruders, kneaders, simple disc reactors and high-viscosity disc reactors.

Branched poly- or copolycarbonates can be prepared analogously to the phase boundary process by using polyfunctional compounds.

The polycarbonates preferably have a molecular weight $M_w$ (weight average, determined by gel chromatography after prior calibration) of at least 10 000 g/mol, particularly preferably of 20 000 g/mol to 300 000 g/mol and in particular of 20 000 g/mol to 80 000 g/mol. They may be linear or branched; they are homopolycarbonates or copolycarbonates based on diphenols of the formula (1a).

By incorporating the diphenols of the formula (1a), novel polycarbonates having a high heat distortion resistance are formed, which also otherwise have a good property profile. This is true in particular for the polycarbonates based on diphenols of the formula (1a) in which m is 4 or 5 and very particularly for the polycarbonates based on diphenols (1b) in which $R^1$ and $R^2$, independently of one another, have the meaning mentioned for the formula (1a) and are particularly preferably hydrogen.

The particularly preferred polycarbonates are therefore those comprising units of the formula (1')

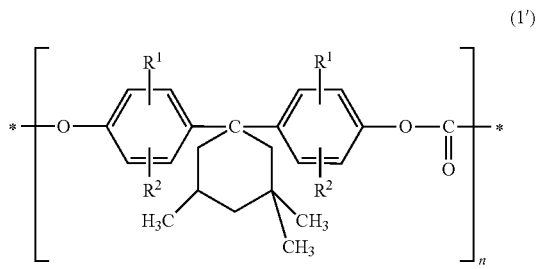

(1')

in which $R^1$ and $R^2$ have the meaning mentioned for formula (1a), but are particularly preferably hydrogen.

These polycarbonates based on diphenols of the formula (1b), in which in particular $R^1$ and $R^2$ are hydrogen, have, in addition to the high heat distortion resistance, good flow behaviour in the melt, which was not to be expected, and show very good solubility in the halogen-free solvents mentioned below.

Owing to the arbitrary composition with other diphenols, in particular with those of the formula (2), it is also possible to vary the polycarbonate properties in an advantageous manner. In such copolycarbonates, the diphenols of the formula (1a) are present in amounts of 100 mol % to 2 mol %, preferably in amounts of 100 mol % to 10 mol % and in particular in amounts of 100 mol % to 30 mol %, based on the total amount of 100 mol % of diphenol units, in polycarbonates.

Component B

The ethylene-alkyl (meth)acrylate block copolymers according to the invention can be described by the general formula (4):

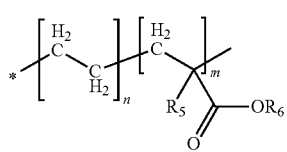

(4)

$R_5$ may be methyl or hydrogen,
$R_6$ may be hydrogen or $C_1$ to $C_{12}$ alkyl radical,
n and m are degrees of polymerization.
$R_6$ is preferably methyl, ethyl, propyl, isopropyl, butyl, sec-butyl, tert-butyl, isobutyl, hexyl, isoamyl or tert-amyl.

The ratios of the degrees of polymerization n and m are preferably in the range of n:m=1:300-90:10.

The ethylene-alkyl (meth)acrylate copolymer may be a random, block or multiblock copolymer or mixtures of these structures.

The melt flow index of the ethylene-alkyl (meth)acrylate copolymer (measured at 190° C. under 2.16 kg load) is preferably in the range of 0.01-40 g/(10 min), particularly preferably in the range of 0.1-10 g/(10 min)

Component C

To the compositions according to the invention can also be added the additives customary for these thermoplastics, such as fillers, UV stabilizers, IR stabilizers, heat stabilizers, antistatic agents and pigments, colorants in the customary amounts; optionally, the demoulding behaviour, the flow behaviour and/or the flame retardance can also be improved by addition of external demoulding agents, flow improvers and/or flameproofing agents (e.g. alkyl and aryl phosphites, phosphates, phosphanes, low molecular weight carboxylic acid esters, halogen compounds, salts, chalk, quartz powder, glass fibres and carbon fibres, pigments and combinations thereof. Such compounds are described, for example, in WO 99/55772, pages 15-25, and in "Plastics Additives", R. Gächter and H. Müller, Hanser Publishers 1983).

Suitable additives are described, for example, in "Additives for Plastics Handbook, John Murphy, Elsevier, Oxford 1999", in "Plastics Additives Handbook, Hans Zweifel, Hanser, Munich, 2001".

Examples of Suitable Antioxidants or Heat Stabilizers Are:
alkylated monophenols, alkylthiomethylphenols, hydroquinones and alkylated hydroquinones, tocopherols, hydroxylated thiodiphenyl ethers, alkylidcnebisphenols, O-, N- and S-benzyl compounds, hydroxybenzylated malonates, aromatic hydroxybenzyl compounds, triazine compounds, acylaminophenols, esters of β-(3,5-bi-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid, esters of 3,5-di-tert-butyl-4-hydroxyphenylacetic acid, amides of β-(3,5-di-tert-butyl-4-hydroxyphenyl)propionic acid, suitable thiosynergists, secondary antioxidants, phosphites and phosphonites, benzofuranones and indolinones.

Organic phosphites, phosphonates and phosphanes are preferred, in general those in which the organic radicals completely or partly comprise optionally substituted aromatic radicals.

o/m-Phosphoric acids, completely or partially esterified phosphates or phosphites are suitable as complexing agents for heavy metals and for neutralization of traces of alkali.

Suitable light stabilizers (UV absorbers) are 2-(2'-hydroxyphenyl)benzotriazole, 2-hydroxybenzophenone, esters of substituted and unsubstituted benzoic acids, acrylates, sterically hindered amines, oxamides and 2-(hydroxyphenyl)-1,3,5-triazines or substituted hydroxyalkoxyphenyl, 1,3,5-triazoles; substituted benzotriazoles, such as, for example, 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-tert-butylphenyl)-5-chlorobenzotriazole, 2-(2'-hydroxy-5'-tert-octylphenyl)benzotriazole, 2-(2'-hydroxy-3',5'-di-tert-amylphenyl)benzotriazole, 2-[2'-hydroxy-3'-(3'',4'',5'',6''-tetrahydrophthalimidoethyl)-5'-methylphenyl]-benzotriazole and 2,2'-methylenebis[4-(1,1,3,3-tetramethylbutyl)-6-(2H-benzotriazol-2-yl)phenol] are preferred.

Polypropylene glycols, alone or in combination with, for example, sulphones or sulphonamides as stabilizers, can be used to prevent damage by gamma rays.

These and other stabilizers can be used individually or in combinations and are added in the stated forms to the polymer.

In addition, processing auxiliaries, such as demoulding agents, generally derivatives of long-chain fatty acids, may be added. For example, pentaerythrityl tetrastearate and glyceryl monostearate are preferred. They are used alone or as mixture, preferably in an amount of 0.01 to 1% by weight, based on the mass of the composition.

Suitable flame-retardant additives are phosphate esters, i.e. triphenyl phosphate, resorcinol diphosphoric acid esters, bromine-containing compounds, such as brominated phosphoric acid esters, brominated oligocarbonates and polycarbonates, and preferably salts of fluorinated organic sulphonic acids.

Furthermore, colorants, such as organic dyes or pigments or inorganic pigments, IR absorbers, can be added individually, as a mixture or even in combination with stabilizers, glass fibres, (hollow) glass spheres, inorganic fillers.

Production of the Moulding Materials and Mouldings

The thermoplastic moulding materials according to the invention are produced by mixing the respective constituents in a known manner and preferably compounding the melt and extruding the melt at temperatures of 240° C. to 300° C. in customary units, such as internal kneaders, extruders and twin-screw apparatuses.

The mixing of the individual constituents can be effected in a known manner, either in succession or simultaneously, in particular either at about 20° C. (room temperature) or at higher temperature.

The invention also relates to processes for the production of moulding materials and to the use of the moulding materials for the production of mouldings and to the shaped articles themselves.

The moulding materials according to the invention can be used for the production of mouldings of all kinds. These can be produced by injection moulding, extrusion and blow moulding processes. A further form of processing is the production of mouldings by thermoforming from previously produced sheets or films.

Films and sheets can be produced, for example, via the melting of the moulding materials in suitable units (e.g. twin-screw extruders) and shaping of the melt by suitable dies.

The polycarbonates and copolycarbonates according to the invention, optionally as a mixture with other thermoplastics and/or customary additives, after processing to give any desired mouldings/extrudates, can be used wherever known polycarbonates and copolycarbonates are used. Owing to their property profile, they are suitable as substrate materials for sheets, multiskin sheets, glazing, diffuser screens, lamp coverings or optical data stores, such as audio CD, CD-R(W), DVD, DVD-R(W) etc., but can also be used, for example, as films in the electrical sector, as shaped articles in automotive construction and as sheets for coverings in the safety sector. Further possible applications of the polycarbonates according to the invention are:

housing parts for electrical devices or apparatuses, such as switchboxes, tool housings, mobile telephones, heating/ventilation panels, tachograph discs, instrument dials, panels and keyboards in electrical and electronic devices, lenses, screen/display covers and LED applications and films for automobile seats.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Compounding

The device for compounding consists of:
Compounding A:
  a metering device for the components,
  a corotating twin-screw kneader from Berstorff having a screw diameter of 25 mm (ZE 25/5),
  a die for shaping of melt extrudates,
  a waterbath for cooling and solidifying the extrudates,
  a pelletizer.
Compounding B:
  a metering device for the components,
  a corotating twin-screw kneader from Clextral having a screw diameter of 32 mm (EV 32),
  a die for shaping of melt extrudates (6 holes of 3.2 mm each),
  a waterbath for cooling and solidifying the extrudates,
  a pelletizer.

As far as compositions are concerned, the mixtures mentioned below were prepared with the aid of the compounding devices described above.

Injection Moulding:

For investigating the mechanical properties, the test specimens required in the corresponding standards were produced by injection moulding. The respective pellets were dried before processing for 5 hours in a vacuum drying oven at 120° C. The melt temperature during injection moulding was 330° C. and the mould temperature 120° C.

Film Extrusion
Film Extrusion A:

Films having a thickness of 100 μm were extruded from the material. For this purpose, a film extrusion machine from Kuhne was used and the material was processed at a melt temperature of 290° C. (Kuhne 37, "chill roll").

Film Extrusion B:

Films having a thickness of 250 μm were extruded from the material. For this purpose, a film extrusion machine from Breyer was used and the material was processed at a melt temperature of 300° C.

The unit used consists of
  an extruder having a screw of 105 mm diameter (D) and a length of 41×D. The screw has a devolatilization zone;
  a coextruder for applying the covering layer with a screw of 25 D length and 35 mm diameter;
  a deflection head;
  a special coextrusion slot die having a width of 1500 mm;
  a three-roll calender having a horizontal roll arrangement, the third roll being pivotable by +/−45° relative to the horizontal;
  a roller conveyor;
  a device for applying protective film to both sides;
  a take-off device;
  a winding station.

The pellets of the base material were fed to the feed hopper of the extruder. In the respective cylinder/screw plasticating system, the melting and transport of the respective material were effected. From the die, the melt travelled to the calender, the rolls of which have the temperature mentioned in Table 1. On the calender, the final shaping and cooling of the material take place. Thereafter, the film is transported through a take-off, the protective film is applied on both sides and the film is then rolled up.

TABLE 1

| Process parameter | Film extrusion 2 Main extruder |
|---|---|
| Melt temperature | 300° C. |
| Deflection head temperature | 285° C. |
| Die/Z1 temperature | 305° C. |
| Extruder speed | 45 min$^{-1}$ |
| Temperature of roll 1 (rubber roll) | 24° C. |
| Temperature of roll 2 | 72° C. |
| Calender speed | 21.5 m/min. |

Mechanical Tests:

The melt flow rate (MRF) of the polymers and polymer compositions was determined according to ISO 1133, ASTM D1238 and the melting point according to ISO 3146, ASTM D3418.

The thermal stability of the materials produced is tested by the determination of the Vicat softening temperature according to ISO 306.

In the determination of the Vicat softening temperature, the plastic test specimen (80×10×4 mm) is clamped in a holder. A planar penetration tip having a cross section of 1 mm$^2$ and a defined impact force is applied. By ensuring the optimum temperature transmission to the sample and uniformly increasing heating rate, the temperature at which the penetration tip has penetrated 1 mm deep into the surface of the plastic test specimen is determined. This corresponds to the Vicat softening temperature according to ISO 306.

The mechanical properties are tested by way of example by means of the notched impact strength, and the tests are effected according to ISO 179/1eA at 23° C. and at −30° C.

For this purpose, a test specimen (80×10×4) is provided with a standard notch (V-shaped, notch radius 0.25 mm) and supported on two sides (support space 62 mm). An impact pendulum strikes the middle of the test specimen at the height of the notch. The test unit consists of an impact pendulum device having a defined work capacity and defined impact speed.

The flexural fatigue strength was evaluated via the double fold number according to Schopper. For this purpose, the double fold number is determined according to (ISO 5625) under standard climatic conditions (23° C., 50% relative humidity).

A double fold is a complete movement of the test strip to both sides along a fold line. The double fold number is the number of double folds which are necessary in order to cause a test strip to tear under standardized load and climatic conditions.

Materials

Polycarbonate having high heat distortion resistance: here, a copolycarbonate consisting of bisphenol A and trimethylcyclohexyl bisphenol (Apec® 1800 from Bayer MaterialScience AG, Leverkusen) having a heat distortion resistance HDT A of 159 C and HDT B of 174 C (measured according to ISO 75-1, -2) and a melt volume flow rate of 10 ml/(10 min), measured according to ISO 1133, was used.

Ethylene-acrylate copolymers: here, block copolymers from DuPont de Nemours (Germany) GmbH, Bad Homburg, were used. More exact descriptions of the types used are shown in the table below.

TABLE 2

Overview of the ethylene-alkyl acrylate copolymers used

| Example | Elvaloy type | Acrylate | Proportion of acrylate* [%] | MFR [g/(10 min)] | Melting point [° C.] |
|---|---|---|---|---|---|
| 1 | 1820 AC | Methyl acrylate | 20 | 8.0 | 92 |
| 2 | 3135 EAC | Butyl acrylate | 35 | 1.5 | 90 |
| 3 | 34035 EAC | Butyl acrylate | 35 | 40.0 | 90 |
| 4 | 3427 AC | Butyl acrylate | 27 | 4 | 94 |

*according to DuPont de Nemours datasheet

Furthermore, for comparison purposes (comparative example 1), a linear three-block copolymer (styrene, ethylene, butadiene) having a proportion of 30-33% of bound styrene (manufacturer's data, BMS 0407) and a solution viscosity of 1.5 Pa·s (manufacturer's data, BMS 0380) and a specific density of 0.91 (according to ISO 2781), obtainable, for example, under the trade name "Kraton 1651 G" from Kraton Polymers LLC, Houston Tex., was used.

Comparative Example 2 corresponds to a copolycarbonate consisting of bisphenol A and trimethylcyclohexyl bisphenol (Apec® 1800, from Bayer MaterialScience, Leverkusen) without elastomer additive.

By compounding in the units described above, mixtures of the polycarbonates stable at high temperature with elastomeric copolymers were prepared according to compositions in Table 3.

TABLE 3

Formulations and properties of the examples and comparative examples

| | Content of elastomer [%] | Elastomer | Vicat [° C.] | Notched impact strength (fracture behaviour) at 23° C. [kJ/m$^2$] | Notched impact strength (fracture behaviour) at −30° C. [kJ/m$^2$] |
|---|---|---|---|---|---|
| Example 1 | 10 | Elvaloy 1820 AC | 170 | 54 (tough) | 18 (brittle) |
| Example 2 | 10 | Elvaloy 3135 EAC | 169 | 51 (tough) | 19 (brittle) |
| Example 3 | 10 | Elvaloy 34035 EAC | 167 | 41 (tough) | 14 (brittle) |
| Example 4 | 10 | Elvaloy 3427 AC | 173 | 39 (tough) | 17 (brittle) |
| Comparative example 1 | 10 | Kraton 1651 G | 178 | 35 (tough) | 15 (brittle) |
| Comparative example 2 | 0 | — | 185* | 11 (brittle)* | 11 (brittle)* |

*according to Bayer MaterialScience AG datasheet

By addition of the elastomers (Examples 1-4, Comparative Example 1), the high heat distortion resistance could be obtained in all cases (Vicat softening temperature >165° C.) and mechanical properties (notched impact strength) could be obtained at a comparable level and even improved relative to the starting material (Comparative Example 2) (Table 3).

Films having a thickness of 100 µm (base material prepared in compounding A, film extrusion A) and 250 µm (base material prepared in compounding B, film extrusion B) were produced from the example materials by means of processes described above. The double fold numbers according to Schopper were determined for these films (cf. Table 4, Table 5).

TABLE 4

Double fold numbers, determined on 100 µm films

| Tests on 100 µm films | Example 1 | Example 2 | Example 3 | Example 4 | Comparative Example 1 |
|---|---|---|---|---|---|
| Double fold number according to Schopper (parallel to the extrusion direction) | 4677 | 4531 | 3797 | 3810 | 582 |

TABLE 5

Double fold numbers, determined on 250 µm films

| Tests on 250 µm films | Example 1 | Example 2 | Comparative Example 2 |
|---|---|---|---|
| Double fold number according to Schopper (parallel to the extrusion direction) | 64.0 | 74.5 | 21.9 |
| Double fold number according to Schopper (transversely to the extrusion direction) | 83.6 | 160 | 17.0 |

As shown in the examples, only the introduction of the ethylene-alkyl acrylate elastomers leads to an improvement in the flexural fatigue strength, detected here by a significant increase in the double fold number according to Schopper, with simultaneous retention of the heat distortion resistance and of the notched impact strength at room temperature and at −30° C. This effect does not occur with another elastomeric ethylene copolymer (Comparative Example 1) and in the case of only the unmodified polycarbonate stable at high temperature (Comparative Example 2).

The invention claimed is:

1. A film comprising a polycarbonate composition comprising:
   A) from 82 to 99.5% by weight, based in each case on the sum of the parts by weight of the components A and B, of at least one polycarbonate having high heat distortion resistance and based on one or more cycloaliphatic bisphenols of Formula (1a)

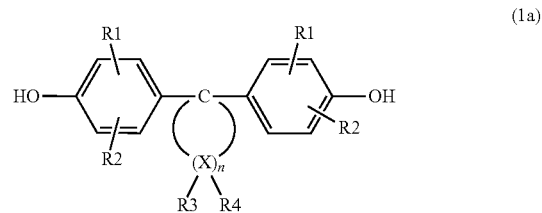

wherein
   R1 and R2 are, independently of one another, hydrogen, halogen, $C_1$-$C_8$-alkyl, $C_5$-$C_6$-cycloalkyl, phenyl, or $C_7$-$C_{12}$-aralkyl,
   n is an integer from 4 to 7,
   R3 and R4 are selectable for each X individually and are, independently of one another, hydrogen or $C_1$-$C_6$-alkyl, and
   X is carbon,
      with the proviso that, on at least one X, R3 and R4 simultaneously are alkyl;
   and
   B) from 0.5 to 18% by weight, based in each case on the sum of the parts by weight of the components A and B, of at least one ethylene-alkyl acrylate block copolymer,
   wherein the film is formed from a composition wherein the composition has the characteristic that when the composition is in the form of a 100 µm thick film it has a double fold number according to ISO 5625 measured parallel to the extrusion direction of 3797 to 4677, or
   wherein the film is Banned from a composition wherein the composition has the characteristic that when the composition is in the form of a 250 µm thick film it has a double fold number according to ISO 5625 measured parallel to the extrusion direction of 64 to 75.

2. The film of claim 1, wherein R1 and R2 are, independently of one another, chlorine, bromine, methyl, phenyl, or H, and n is 4 or 5.

3. The film of claim 1, wherein component A comprises a copolycarbonate of bisphenol A and bisphenol TMC.

4. The film of claim 1, wherein said composition contains from 89 to 99 parts by weight of component A and from 1 to 11 parts by weight of component B, based in each case on the sum of the parts by weight of the components A and B.

5. The film of claim 1, wherein said ethylene-alkyl (meth) acrylate block copolymer of component B is an ethylene-alkyl (meth)acrylate block copolymer of formula (4):

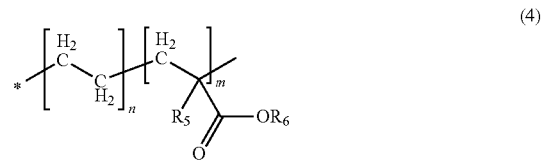

wherein
   $R_5$ is methyl or hydrogen,
   $R_6$ is a $C_1$ to $C_{12}$ alkyl radical, and
   n and m are degrees of polymerization.

6. The film of claim 5, wherein $R_6$ is methyl, ethyl, propyl, isopropyl, butyl, sec-butyl, tert-butyl, isobutyl, hexyl, isoamyl, or tert-amyl.

7. The film of claim 5, wherein the ratio of the degree of polymerization n to degree of polymerization m is in the range of from 1:300 to 90:10.

8. The film of claim 1, further comprising from 0 to 5 parts by weight, based on the sum of the parts by weight of the components A and B, of additives as component C.

9. A method for forming a shaped article, extrudate, film, or film laminate comprising utilizing the film of claim 1.

10. The method of claim 9, wherein said at least one polycarbonate is a copolycarbonate.

11. The method of claim 9, wherein said article, extrudate, film, or film laminate is a housing part of an electrical device or apparatus, a tool housing, a mobile telephone, a heating/ventilation panel, a tachometer disc, an instrument dial, a panel, a keyboard in an electrical or an electronic device, a lens, a screen/display cover, an LED application, or a film for an automobile seat.

12. The method of claim 11, wherein said electrical device or apparatus is a switch box.

\* \* \* \* \*